Figure 1:
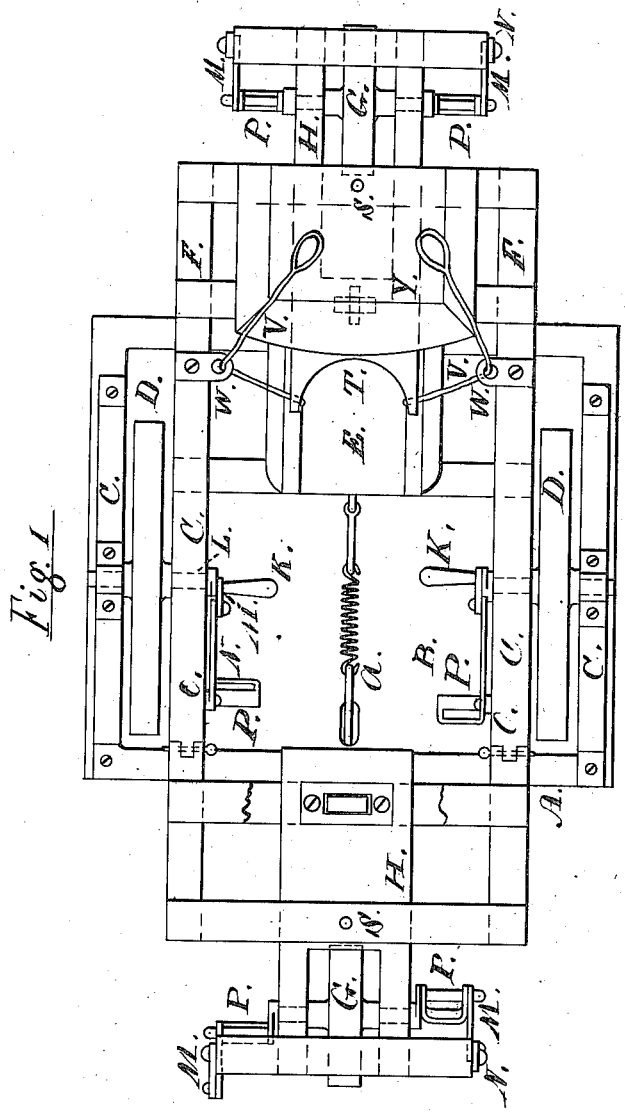

(Model.)

2 Sheets—Sheet 1.

A. VREELAND.
Velocipede.

No. 243,476. Patented June 28, 1881.

Attest:
George B. Adams.
Wm. Van Falen

Inventor.
Aaron Vreeland
By Horace Harris
Atty

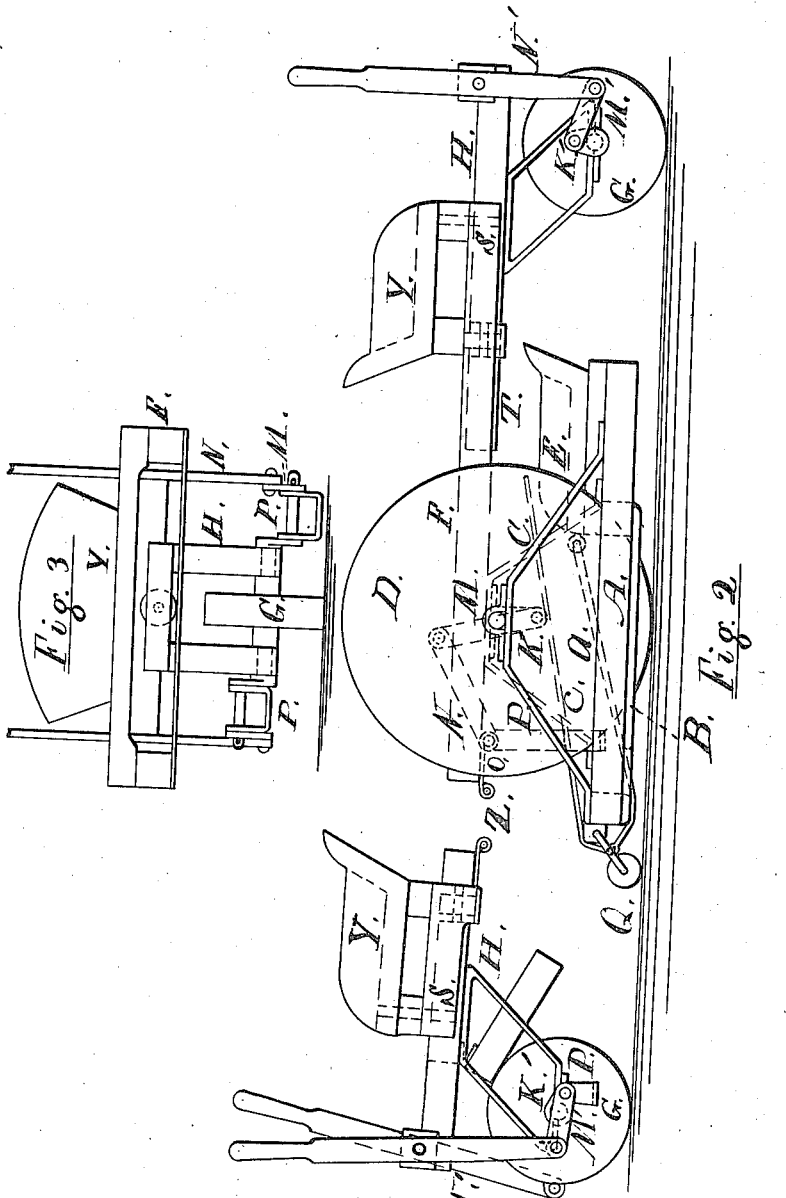

UNITED STATES PATENT OFFICE.

AARON VREELAND, OF CEDAR GROVE, NEW JERSEY.

VELOCIPEDE.

SPECIFICATION forming part of Letters Patent No. 243,476, dated June 28, 1881.

Application filed December 8, 1880. (Model.)

*To all whom it may concern:*

Be it known that I, AARON VREELAND, of Cedar Grove, in the county of Essex and State of New Jersey, have invented a new and useful Improvement in Velocipedes, of which the following is a specification.

My invention relates to velocipedes having three wheels and operated by hand and foot power, and provided with a front and rear extension to allow one or more extra persons to ride, and at the same time to assist in propelling it; and it consists in a central skeleton-frame with hand and foot power appliances, in the extensions, in a spring adjusting wheel, and in special steering devices.

Figure 1 is a general plan, showing the velocipede with front and rear extensions attached. Fig. 2 is a side elevation with the rear extension attached and the front disconnected. Fig. 3 is a rear view of the front extension.

My velocipede proper is made with a frame, A, having the bottom B, and in the sections of the frame, on either side, are hung on the skeleton-supports C the driving-wheels D. At the rear of the frame A is a seat, E, for the operator. Resting on the supports, inside of the driving-wheels, is a frame, F, to carry a third or guiding wheel, G, hung by a skeleton-frame, H, usually near the seat E.

Inside the frame A, and forward of seat E, is a hand-crank, K, connected with the axle L of the driving-wheel on either side, the wheels being fast to the axles. With this crank is connected a jointed lever, M N, the section N being pivoted at O to the frame F, the lower end carrying a stirrup, P, for the foot of the operator, who sits in the seat E, and, taking hold of the crank K and putting his feet in the stirrups, propels his vehicle by their mutual co-operation, the jointed lever, under the foot-pressure, aiding in moving the crank.

In front of the frame A is a small adjustable wheel, Q, having a cord and spring, *a*, connecting it with the seat, to provide for running on a horse-car track, the spring adapting it to inequalities of surface. If not to be used on a car-track, the wheel is drawn up by the cord *c* out of the way.

The frame H is pivoted at S to the frame F, and the front end, T, is hollowed out to fit the back of the operator sitting in the seat E, and by the movement of the body this frame is moved one way or the other to guide the velocipede. In addition, cords V are attached to projecting ends of the section T, and, passing through loops or over rollers W, may be brought up onto the shoulders of the operator and assist in moving the part T and in guiding the vehicle.

With the rear of the frame F may be connected an extension, consisting in lengthening the frame beyond what would be required for the wheel only and in placing on the frame the seat Y, and in connection with the wheel the crank K' and jointed lever M' N', the section N' extending up to within the reach of the hand of the operator, in this case the difference being that the hand operates this lever, instead of directly operating the crank. A stirrup may or may not be used in this extension. A similar extension by the loops Z and pins may be connected with the front end of the vehicle, as shown detached in Fig. 2.

I claim—

1. The velocipede having the frame A, for carrying the driving-wheels D, arranged in part on both sides of the wheels, and having the supports C and the bottom B, and provided with the seat E, substantially as and for the purpose specified.

2. The combination of the frame A, constructed and arranged substantially as described and shown, the seat E, wheels D, cranks K, joint-lever M N, and stirrup P, substantially as and for the purpose set forth.

3. The combination, with the frame, seat, wheels, and hand and foot power apparatus, constructed and arranged substantially as described, of the adjustable spring-roller, substantially as and for the purpose named.

4. In combination with the seat E, guiding-wheel G, and frame H, the steering apparatus T, and also the cords V, substantially as set forth.

5. In combination with the velocipede, constructed and arranged substantially as described and shown, an extension for the front and rear, substantially as and for the purpose specified.

AARON VREELAND.

Witnesses:
HORACE HARRIS,
GEORGE B. ADAMS.